United States Patent [19]
Holmes

[11] 3,727,326
[45] Apr. 17, 1973

[54] PROGRAMMED LEARNING DEVICE

[76] Inventor: James D. J. Holmes, Dogwood Lane, Laurinburg, N.C. 28352

[22] Filed: July 24, 1970

[21] Appl. No.: 58,096

[52] U.S. Cl. .................................................35/9 A
[51] Int. Cl. ..............................................G09b 7/08
[58] Field of Search.....................35/9 R, 9 A, 48 R

[56] References Cited

UNITED STATES PATENTS

| | | | |
|---|---|---|---|
| 3,300,876 | 1/1967 | Johannsen | 35/48 R |
| 3,332,157 | 7/1967 | Kirkconnell et al. | 35/48 R |
| 3,407,513 | 10/1968 | Conn | 35/9 A |
| 3,416,242 | 12/1968 | Nisbet | 35/48 R |

Primary Examiner—Wm. H. Grieb
Attorney—John G. Mills, III

[57] ABSTRACT

In abstract, a preferred embodiment of this invention is a programmed learning device wherein one or more students, small groups working together, are taught by the non-linear method of programmed learning. Specifically, after the text material is reviewed by the group, a question relative thereto is presented. Feedback relative to wrong answers will then be first displayed prior to the giving of feedback relative to the correct answer. No unchosen wrong answer feedback, however, is displayed.

10 Claims, 2 Drawing Figures

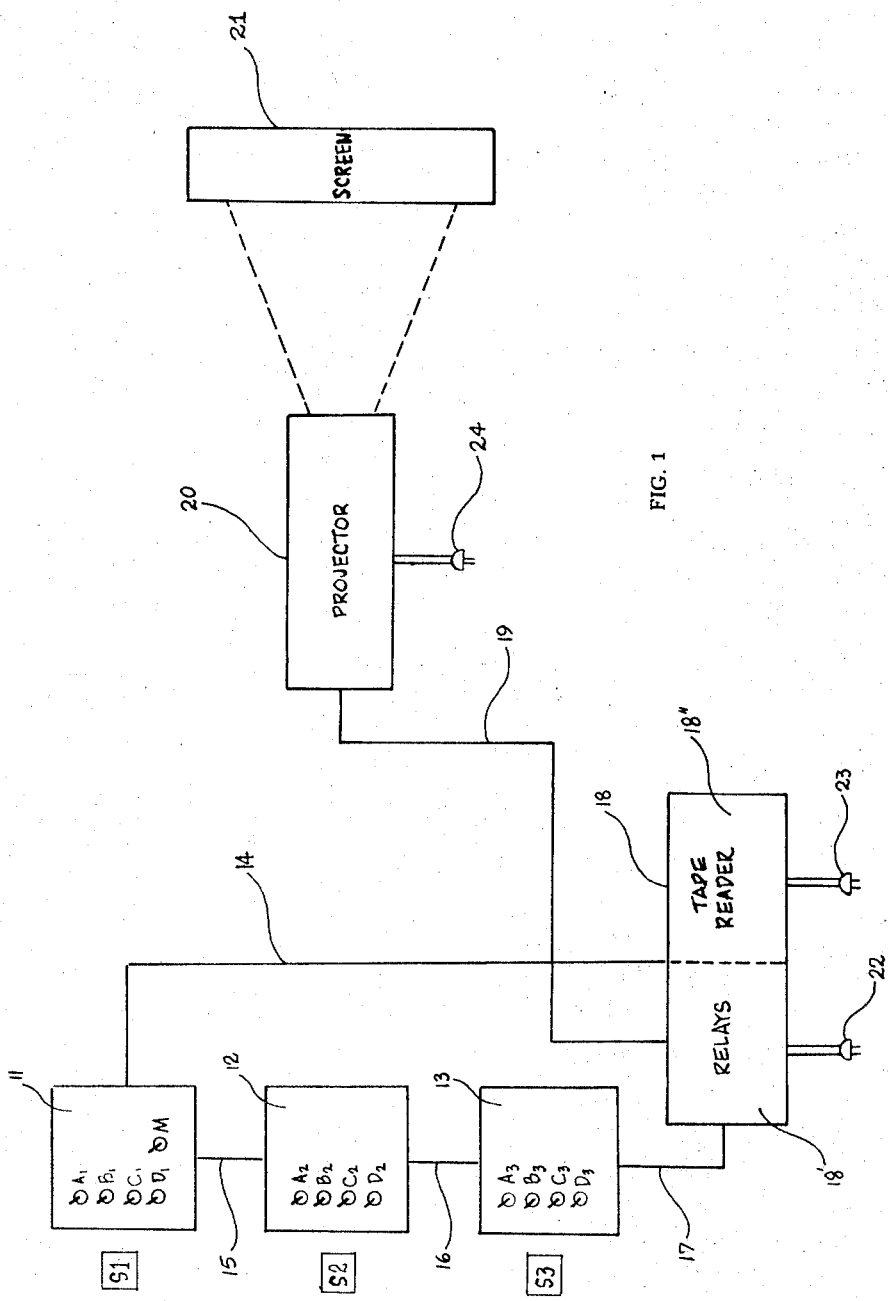

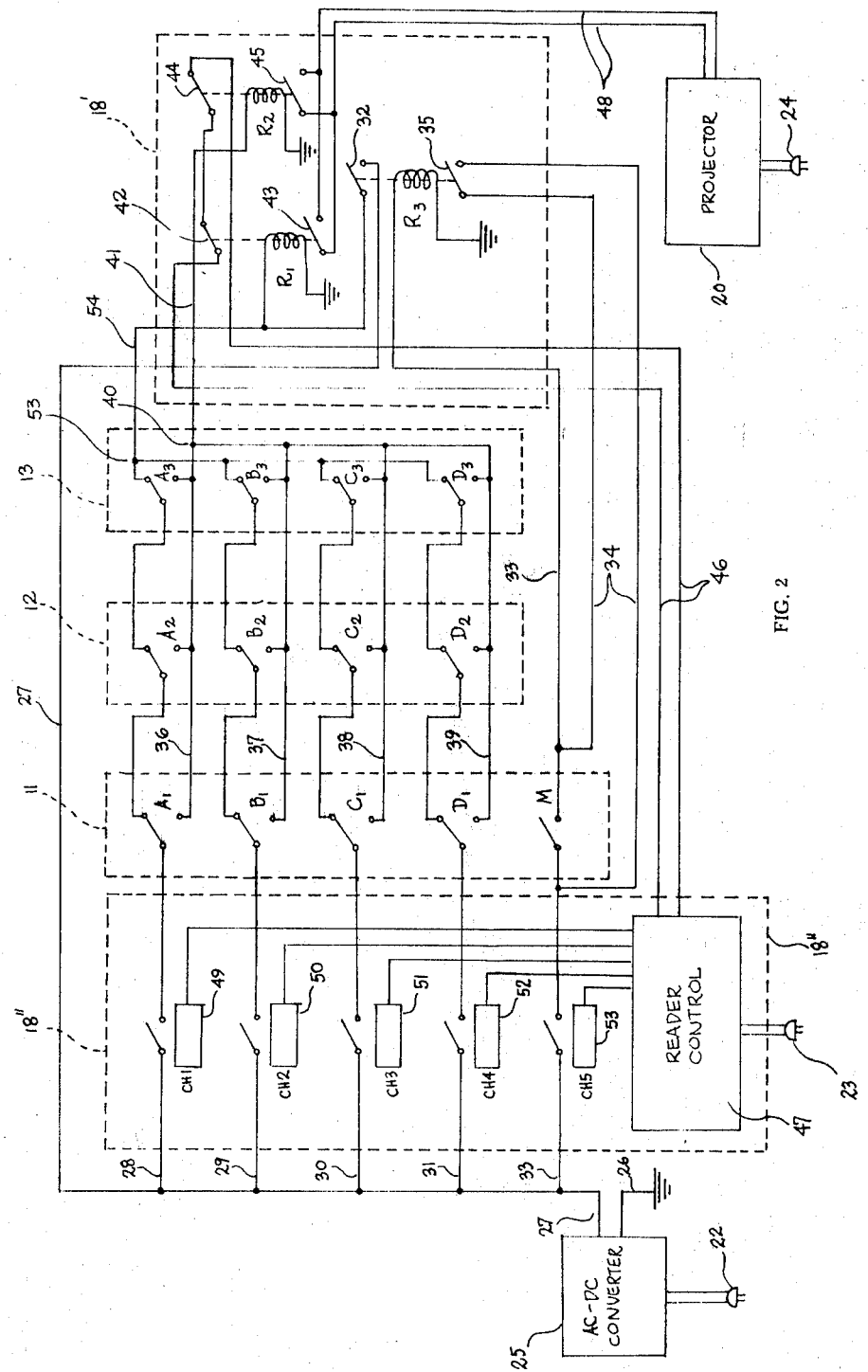

PROGRAMMED LEARNING DEVICE

This invention relates to teaching means and more particularly to programmed learning devices employing the non-linear method of programmed learning.

In the past, various mechanical methods of instructing and teaching have been used including projecting images on a screen for group instruction and questions with answers being either written down or tabulated from switch boxes at each student's position. Also instructional and testing systems have been developed, including a central console with a plurality of student stations, earphones for private student listening, and controls for recording of answers to questions presented.

In recent years, extremely complex programmed electronic systems have been developed to aid in teaching and testing. All of these prior art devices, however, have resulted in general student boredom and in feelings of impersonal, machine controlled complexes.

The present invention has been developed after much research and study into the above mentioned problems and is designed to allow a group of students or persons to be instructed and tested together, as a group, rather than individually with group participation in both the wrong answers given and the logic behind the correct answer or answers.

Non-linear programmed learning is commonly found in the form of scrambled textbook where the student is presented with text material followed by a multiple choice question designed to test his comprehension of just-read material. Based upon the choice of answers, the student is directed to a different location in the book where he will receive feedback relative to the accuracy of his answer. The non-linear method is a proven method of teaching. It has the disadvantage, however, of creating boredom due to much flipping of pages back and forth and loneliness due to lack of any personal interaction on the part of the student with others. The programmed learning system of the present invention, with a multiplicity of students working together, is a numerically controlled teaching device designed to employ, and thus retain the advantages of the non-linear method of programmed learning while negating the normal disadvantages of such method.

The learning system of the present invention has also been developed to help fill the rather large void between relatively inexpensive conventional textbooks and very expensive computer assisted instruction means. Building upon the Socratic principle of one teacher, one pupil, the present invention adds mechanization for the sake of efficiency but, more importantly, it introduces group discussion into programmed learning. Thus the combination of the Socratic concept, mechanization, and group discussion are combined to form the present improved programmed learning systems.

It is an object, therefore, of the present invention to provide a programmed learning device that allows student discussion of the material being presented.

Another object of the present invention is to provide a programmed learning system specifically designed to allow interaction between students.

Another object of the present invention is to provide a learning device which introduces group discussion into programmed type learning.

Another object of the present invention is to provide a method of non-linear programmed learning that substantially eliminates boredom caused by impersonal operation.

Another object of the present invention is to provide a programmed learning device which presents text material, a question, multiple choice answers to the question, explanations as to why selected wrong answers are wrong, and finally presents the correct answer with logic relative thereto.

An additional object of the present invention is to provide a programmed learning device, including at least one remote student station, each operatively connected to a tape reader and a projector whereby both non-linear programmed learning and user interaction can be accomplished.

A further object of the present invention is to provide a tape controlled, relay operated programmed learning device with manual operation of selected modes and automatic operation of other modes.

Another object of the present invention is to provide a programmed learning system wherein feedback relative to any and all wrong answers selected are fed back prior to projection of feedback relative to the correct answer.

Other objects and advantages of the present invention will become apparent and obvious from a study of the following description and the accompanying drawings which are merely illustrative of such invention.

In the drawings

FIG. 1 is a block diagram of the stations and equipment forming the preferred embodiment of the programmed learning device of the present invention; and FIG. 2 is an electrical circuit, in schematic form, of such device.

With further reference to the drawings, a plurality of student response devices or consoles 11, 12 and 13 are provided. Each of the consoles contains a plurality of switches such as those labeled A1, B1, C1, D1 on console 11; A2, B2, C2 and D2 on a console 12; and A3, B3, C3 and D3 on console 13. In addition, console 11 also contains a manual switch labeled M. The students operating the consoles are labeled in FIG. 1 as S1, S2 and S3.

Coaxial or multistrand electrical cables indicated at 14, 15, 16 and 17 are used to connect, respectively, the relay-reader 18 to console 11, console 11 to console 12, console 12 to console 13, and console 13 to relay portion 18' of the relay-reader. A multistrand electrical cable 19 also connects the relay portion 18' to projector 20. This projector is, of course, set up in such a way that images therefrom will project onto screen 21 which is disposed in view of the students, S1, S2 and S3.

Electrical power plugs 22, 23 and 24 are operatively connected, respectively, to relay section 18' and reader section 18'' of chassis 18 and to projector 20. Each of the power plugs is, of course, adapted to operatively connect to a conventional exterior electrical power source (not shown).

Although any number of readers for program control can be used, a simple punched tape type device (not shown) in combination with electrically conductive sensing pins (not shown) has been found to operate very satisfactorily. The tape reader, as well as conventional time delay and instant operating relays, are all operatively mounted on chassis 18 for operation as will hereinafter be described in more detail.

Now specifically referring to the wiring diagram shown schematically in FIG. 2, since direct current is often used to operate the electromagnetic core of a relay, an AC-DC converter of standard construction is shown at 25 to enable the system to operate from a standard 110 volt, 60 cycle AC power source. On the DC side of the converter is a ground 26 and a current line 27. Connected to line 27 are a plurality of leads 28, 29, 30, 31 and 33 going into the reader 18" and connected, respectively to the controlled channel switches labeled Ch-1, Ch-2, Ch-3, Ch-4 and Ch-5 therein.

From the channel switches, leads 28 through 31 continue and are connected, respectively, to answer selection switches A1, B1, C1 and D1 incorporated in student console 11. These switches are normally closed for continuous closed circuit along their respective leads.

From console 11, leads 28 through 31 continue into student console 12 and to the switches labeled A2, B2, C2 and D2 which correspond in function to switches A1, B1, C1 and D1.

The leads 28 through 31 then continue from console 12 to student console 13 where they connect, respectively, to switches labeled A3, B3, C3 and D3. The leads from these switches continue and merge at juncture 53 into line 54. This line connects to the core of relay R1 and therethrough to ground.

The normally open contact of switches A1, A2 and A3 of consoles 11, 12 and 13 are all connected in series by lead 36. Likewise, the normally open side of switches B1, B2 and B3 are interconnected by lead 37 as are switches C1, C2 and C3 by lead 38 and switches D1, D2 and D3 by lead 39. All of these four last mentioned leads merge at junction point 40 into line 41 which is connected to the core of relay R2 which in turn is grounded.

Line 27 continues from the junction of lead 28 through normally open relay switch 32 of the relay labeled R3 and through such switch to the core of the relay labeled R1, which terminates at a common ground.

A fifth lead 33 from line 27 passes through the normally open channel switch labeled Ch-5 of the reader and into the normally open switch M of student console 11. From this last mentioned switch, lead 33 is wired into the core of relay R3 and to a common ground. Bypassing switch M of console 11 is a pair of leads 34 which are operatively connected to normally open relay switch 34 of relay R3.

A pair of relay switches 42 and 43 are operatively associated with relay R1 and a second pair of relay switches 44 and 45 are operatively associated with relay R2. A line 46 extends from the reader control 47 of the tape reader 18", connects switch 42 of relay R1 and switch 44 of relay R2 in parallel and returns to such control.

Line 48 extends from the normal switching mechanism (not shown) of the projector 20, is connected in parallel to switches 43 and 45 and returns to such projector.

Because of the large number of f mechanisms for accomplishing the desired end result, the reader control 47 is shown as only schematically connected to the various channel switch closing means 49, 50, 51, 52 and 53. As heretofore mentioned, an electrically conductive pin which projects through a tape opening has been found satisfactory to act as a channel switching means although an electronic sensing head, or other similar means, could obviously just as well be used although the cost factor involved would certainly have to be taken into consideration.

From a comparison of FIGS. 1 and 2, it is obvious that the coaxial cable 14 carries not only leads 28, 29, 30, 31 and 33 from the tape reader section of the chassis 18 but also the continuation of lead 33 from the manual switch to the relay section as well as lines 34 thereto.

Cable 15 extending between console 11 and console 12 carries leads 28 through 31 therebetween as well as leads 36 through 39 while cable 16 carries the same leads between console 12 and console 13.

Cable 17 carries lines 54 and 41, which represents merged leads 28 through 31 and 36 through 39 respectively, from console 13 to the relay section 18' of chassis 18. Cable 19, of course, carries the pair of lines 48 between relay section 18' and projector 20. Since the relay section 18' and the reader section 18" are both mounted on a single chassis 18, the interconnection therebetween would be internal as seen in FIG. 1 and would be wired as disclosed in FIG. 2.

Prior to describing the device of the present invention in actual operation, it should be noted that the switches associated with relay R1 are time delay switches and are preferably of the adjustable type with a range of from 0 to 10 seconds. Relay R2 is also a time delay relay preferably with an adjustable setting from 1 to 180 seconds. R3, on the other hand, is a non-delay or instant reaction relay.

In discussing the programmed learning device of the present invention, it must be understood that the reader, when energized from either relay R1 or relay R2, will move ahead one block of subject matter or frame and stop as will the projector. Neither of these units is designed to reactivate and move to the next frame or position without the occurrence of another specified condition.

In setting up the learning device of the present invention, each frame or position in the projector would be synchronized with a frame or position on the reader. Thus you would have one or more frames in both units for text material, a question with up to four multiple choice answers, and separate feedback for each answer that might be chosen.

An example of the order of the material described for the projector alone would be: slide or frame 1, text material; slide 2, text material; slide 3, question; slide 4, feedback directed to answer A; slide 5, feedback directed to answer B; slide 6, feedback directed to answer D; slide 7, feedback directed to answer C.

In the example given, there are, of course, two text slides. There can, of course, be no text slides or as many as desired. The feedback slides will be noted as arranged A, B, D, C, with the assumption being that C is the correct answer. If instead A was the correct answer, the ranking of slides 4 through 7 would be B, C, D and A. If on the other hand, B was the correct answer, the slide order would be A, C, D, B.

From the schematic shown in FIG. 2, it will be noted that channel 1 controls the input to answer switches A for all consoles, channel 2 controls the input to answer switches B, channel 3 controls the input to answer switches C, channel 4 controls the input to answer switches D, and channel 5 controls the input to manual switch M.

Using an extension of the example given, wtih an assumed correct answer of C, the following synchronization between projector and reader would be in evidence: Channel 5, slide or channel 0, blank material; channel 5, slide 1, text material; channel 5, slide 2, text material; channel 5, slide 3, question; channel 1, slide 4, feedback A; channel 2, slide 5, feedback B; channel 4, slide 6, feedback D; channel 5, slide 7, feedback C.

As heretofore noted, the device of the present invention operates in both manual and automatic modes. Using the last example given, the manual mode is operative through slide 3 and becomes operative again on slide 7. This manual mode is necessary so that the material on these slides may be viewed as long as desired by the students. Relative to the circuit diagram, the manual mode operates through relay R3 and then relay R1. In this particular example, the automatic mode is operative on slides 4, 5 and 6 with the time delay of either relay R1 or relay R2 controlling the automatic time delay depending upon whether one of the parallel switches leading from that particular channel has been thrown or not. Thus incorrect solutions indicated will receive a predetermined length of feedback time, within allowable limits of from 1 to 180 seconds being available. The feedback to each student with an incorrect solution explains the logic of the chosen answer and what steps should be taken to avoid this type of error in the future. Reinforcement of the student or students choosing the correct solution and a presentation of the logic thereof is fedback not only to these students but also to the students having chosen the incorrect solution or solutions. After the correct answer is given, the system returns to manual mode so that when the last feedback has been digested, the manual switch may be used to move the device to the next topic.

From the above, it should be evident that the relays R1, and R2 serve to limit the movement of the reader and projector from one frame to the next whereas the normally open contacts associated with the five channels serve to allow selective review of the condition of one set of switches at a time.

The following description, by occurrence and function, will exemplify operational use of the wrong answer discriminator of the present invention.

Student, S1 passes the manual switch on student console 11 which activates relay R3 immediately which in turn activates relay R1 after a slight time delay. Projector 21 is thus caused to move to slide 1 which is projected onto screen 21 and simultaneously reader 18'' moves to frame 1 and closes the contacts of channel 5.

Upon mutual agreement between students S1, S2 and S3, S1 closes manual switch M again on his console to activate relay R3 and in turn relay R1. The projector and reader both move one frame and the reader again closes the contacts of channel 5.

The students then choose their answers, as for example, S1 might choose answer switch C on his console 11, S2 might choose answer switch A on his console 12, and student S3 might choose answer switch B on his console 13.

After all three students have chosen their answers, S1 again closes the manual switch M on his console to move the system from manual to automatic mode.

This closing of the manual switch activates relay R3 which in turn activates relay R1. The projector and reader move one frame which brings up frame or slide 3. The reader closes channel 1 allowing current to flow through switches A1, A2 and A3 of consoles 11, 12 and 13, respectively. Since S2 chose the answer for switch A, he studies the feedback given on slide 3 for the predetermined length of time controlled by relay R2 (40 seconds being determined as a good average time).

After the 40-second delay, R2 is activated. The projector and reader are thus caused to move to frame 4. The reader then senses and closes channel 2 allowing current to flow through switches B1, B2 and B3 of console 11, 12 and 13, respectively. Since S3 chose the answer B, he has an opportunity to study the feedback given on slide 4 for the predetermined study time controlled by the delay of relay R2.

After this time delay, R2 is activated causing the projector and reader to move to slide-frame 5. The reader senses and closes channel 4 thus allowing current to flow through switches D1, D2 and D3. Since in the example given, neither D1, D2 nor D3 has been chosen, R1 is activated after a slight delay of between 1 and 10 seconds. The reason for this delay is, of course, to allow time for both the projector and reader to cycle and be ready for the next motivating signal.

When R1 is activated, both the projector and the reader move to slide-frame 6. The reader senses and closes channel 5. Students S1, S2 and S3 then study the feedback relative to answer switch C which is the correct answer and which is always given last regardless of whether the correct answer switch was closed. Since channel 5 is manual mode, answer study may be for as long a period as desired.

Upon mutual agreement, S1 then presses manual switch M to move the projector and reader to the next block of subject matter. The same functions are repeated as programmed, with the correct answer at all times coming up on the last frame of the series.

From the foregoing, it is obvious that the present invention has the advantage of providing an inexpensive, yet efficient, non-linear programmed learning device which allows multistudent participation thus relieving boredom and creating interest. The present invention also has the advantage of being adaptable to various types of read-out devices including slide projectors, television readers, film projectors and the like. The programmed learning device of the present invention has the additional advantage of being simple to construct and repair and yet foolproof in operation.

Th present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A programmed learning device comprising: means for displaying a question and multiple answers to a plurality of students, one of said answers being correct; means for registering an answer selection from each of said plurality of students; means for discriminating between wrong answers selected and the correct answer; means controlled by said discriminator to serially display feedback relative to selected wrong answers to the student group; and means controlled by said discriminator to finally display feedback relative to the correct answer to the group whereby group participation can be accomplished using non-linear programmed learning.

2. The device of claim 1 wherein the display means is a projector and screen.

3. The device of claim 2 wherein the projector is of the slide type.

4. The device of claim 2 wherein the projector is of the film type.

5. The device of claim 1 wherein the discriminator means is controlled by a tape reader type program control means.

6. A programmed learning device comprising: a projector means for displaying a question and multiple answers to a plurality of students, one of said answers being correct; means for registering an answer selection from each of said plurality of students; a tape recorder controlled means for discriminating between wrong answers selected and the correct answer; means controlled by said discriminator to serially display feedback relative to the selected wrong answers to the group; and means controlled by said discriminator to finally display feedback relative to the correct answer to said group whereby group participation can be accomplished using non-linear programmed learning.

7. The device of claim 6 wherein the projector is of the slide type.

8. The device of claim 6 wherein the projector is of the film type.

9. A learning device comprising: a visual display means; a plurality of student control consoles having answer selection switches thereon; a programmed control means operatively connected to said switches and said display means; and discriminator means operatively connected to said control means for allowing feedback relative to selected wrong answers to be visually displayed prior to the display of feedback relative to the correct answer whereby an efficient, non-linear programmed learning device is provided.

10. The learning device of claim 9 wherein the programmed control means is a tape reader.

* * * * *